United States Patent
Pontaoe et al.

(10) Patent No.: US 8,336,173 B2
(45) Date of Patent: Dec. 25, 2012

(54) CLIP ASSEMBLY

(75) Inventors: John S. Pontaoe, Chicago, IL (US); Scott D. Kolasa, Mount Prospect, IL (US)

(73) Assignee: Illinois Tool Works Inc., Glenview, IL (US)

( * ) Notice: Subject to any disclaimer, the term of this patent is extended or adjusted under 35 U.S.C. 154(b) by 454 days.

(21) Appl. No.: 12/365,464

(22) Filed: Feb. 4, 2009

(65) Prior Publication Data

US 2009/0235497 A1    Sep. 24, 2009

Related U.S. Application Data

(60) Provisional application No. 61/037,829, filed on Mar. 19, 2008.

(51) Int. Cl.
*A44B 11/00* (2006.01)
*A44B 11/06* (2006.01)

(52) U.S. Cl. .......... 24/537; 24/265 EC; 24/517; 24/542; 24/328

(58) Field of Classification Search .......... 24/538, 24/614, 537, 542, 543, 517, 515, 265 EC, 24/487, 348, 349, 346, 343, 328, 72.5
See application file for complete search history.

(56) References Cited

U.S. PATENT DOCUMENTS

| | | | | |
|---|---|---|---|---|
| 124,071 A * | 2/1872 | Lipsey | | 24/537 |
| RE6,796 E * | 12/1875 | Smith | | 24/348 |
| 183,556 A * | 10/1876 | Fyfe | | 24/537 |
| 391,307 A * | 10/1888 | Ferguson | | 24/15 |
| 692,274 A * | 2/1902 | Gumaer | | 24/537 |
| 718,273 A * | 1/1903 | McLellan | | 119/812 |
| 1,110,579 A * | 9/1914 | Seeber | | 24/537 |
| 2,058,102 A * | 10/1936 | Philipp | | 248/316.2 |
| 2,337,723 A * | 12/1943 | Levin | | 223/96 |
| 3,100,324 A * | 8/1963 | Tutino et al. | | 24/346 |
| 3,235,928 A * | 2/1966 | Clark | | 24/517 |
| 4,308,981 A * | 1/1982 | Miura | | 223/96 |
| 4,566,157 A * | 1/1986 | Packendorff | | 24/536 |
| 4,716,634 A * | 1/1988 | Fan | | 24/545 |
| 5,388,313 A * | 2/1995 | Cameron | | 24/537 |
| 6,427,292 B1* | 8/2002 | Seifert | | 24/265 EC |
| 6,698,071 B1* | 3/2004 | Greer et al. | | 24/537 |
| 7,152,284 B1* | 12/2006 | Greer et al. | | 24/537 |
| 7,308,739 B2 | 12/2007 | Andersen et al. | | |
| 2002/0000027 A1 | 1/2002 | Andersen et al. | | |
| 2005/0257353 A1* | 11/2005 | Rohrig | | 24/537 |
| 2009/0235497 A1* | 9/2009 | Pontaoe et al. | | 24/538 |

OTHER PUBLICATIONS

International Search Report and Written Opinion for PCT/US2009/033333.

* cited by examiner

*Primary Examiner* — Robert J Sandy
*Assistant Examiner* — Tyler Johnson
(74) *Attorney, Agent, or Firm* — Mark W. Croll; Paul F. Donovan

(57) ABSTRACT

A clip assembly adapted to engage a male track member. The clip assembly includes a clamshell clamping member including a first leg and a second leg. The clip assembly further includes a female compression member adapted to fit in sliding relation at least partially about the clamshell clamping member. The female compression member is adapted to compress the first leg towards the second leg.

14 Claims, 3 Drawing Sheets

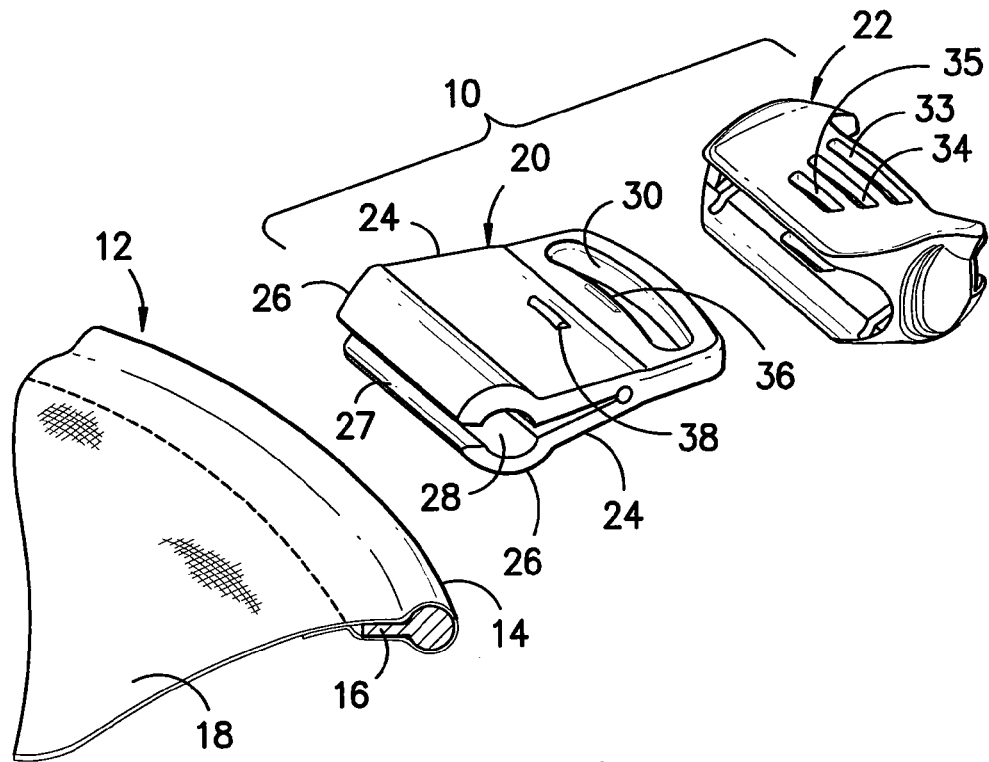
FIG. -1-
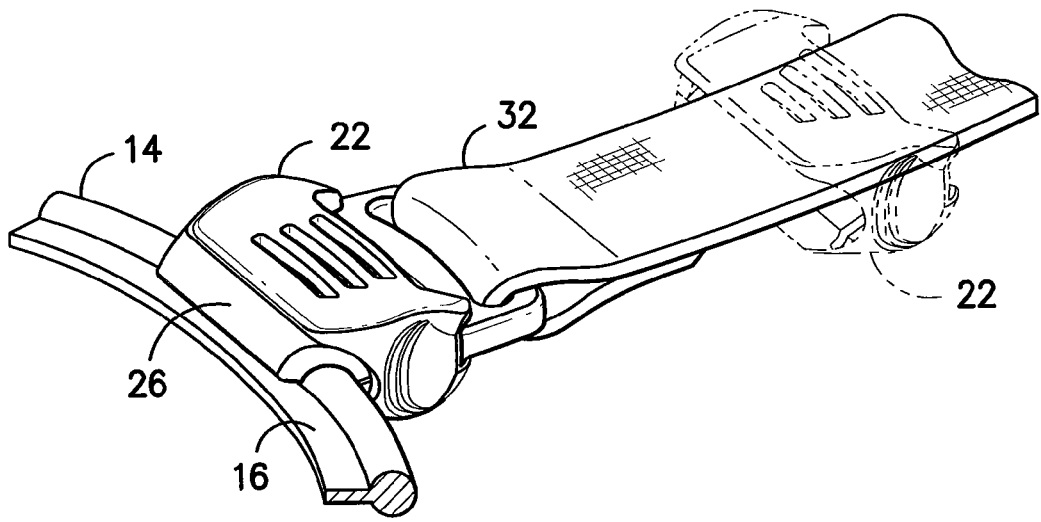
FIG. -2-

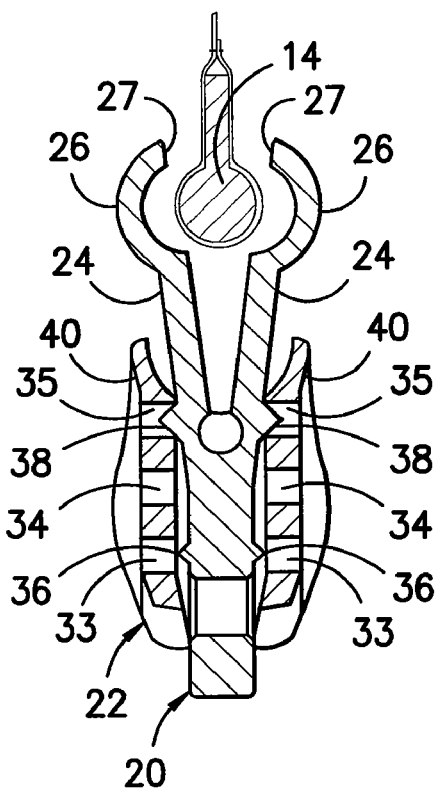
FIG. -3-
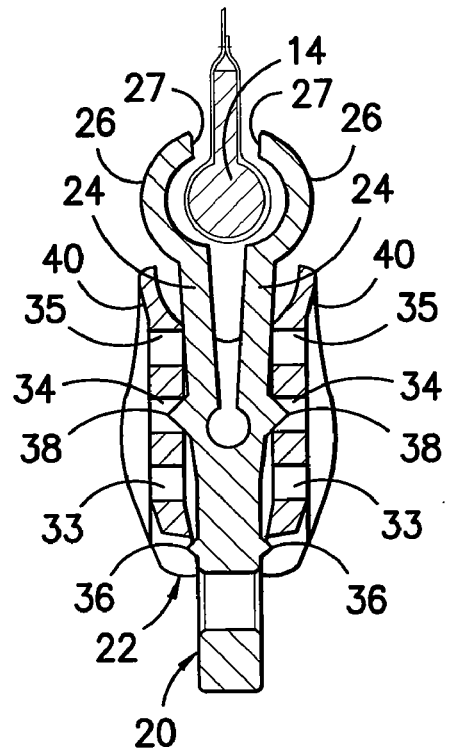
FIG. -4-
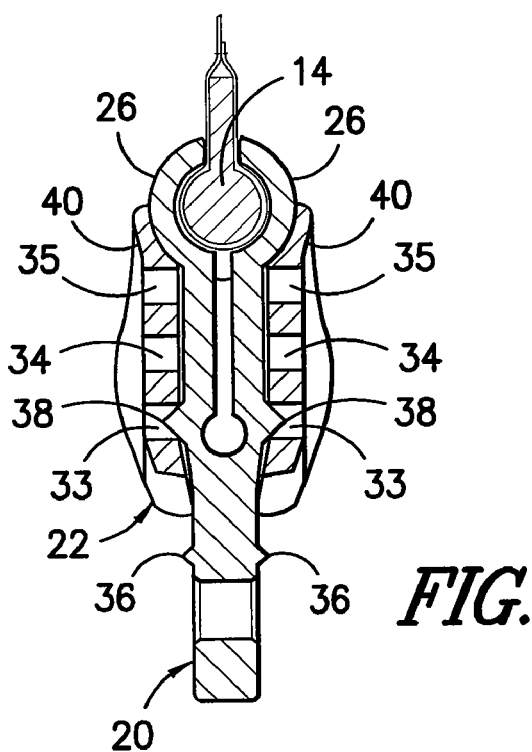
FIG. -5-

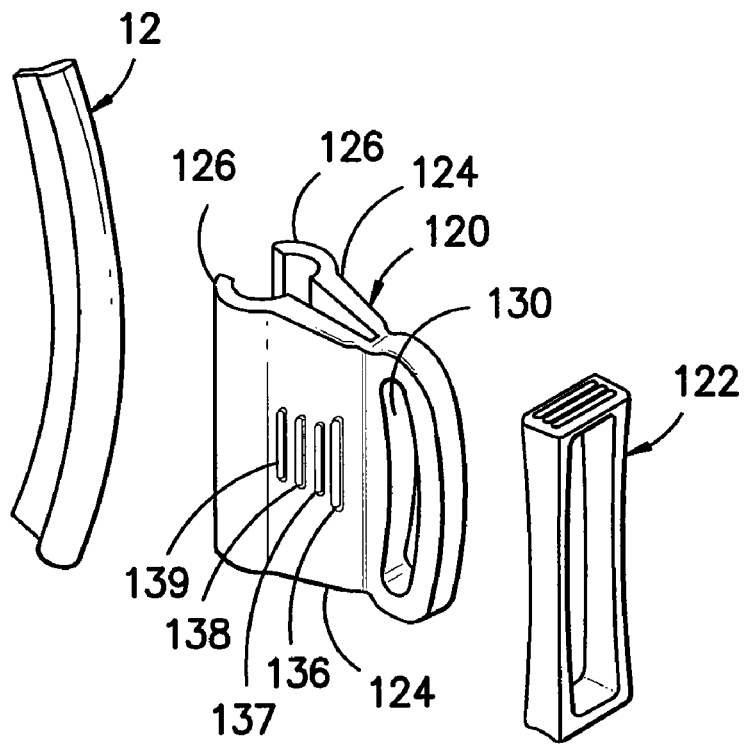
FIG. -6-
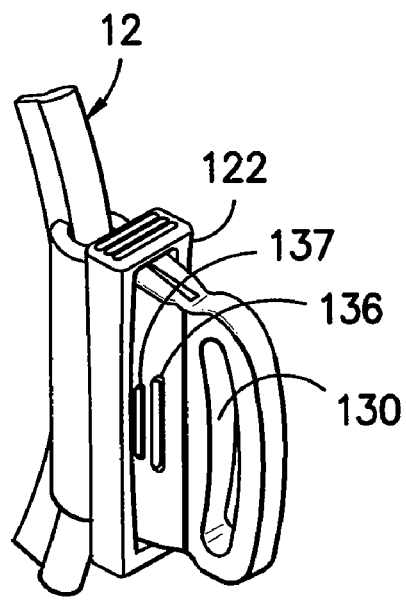
FIG. -7- ically claims the benefit of U.S. Provisional

CLIP ASSEMBLY

CROSS-REFERENCE TO RELATED APPLICATION

This Application claims the benefit of U.S. Provisional Application Ser. No. 61/037,829 filed Mar. 19, 2008, the contents of which are hereby incorporated by reference as if fully set forth herein.

FIELD OF THE INVENTION

The present invention relates generally to a clip assembly, and more particularly, to a clip assembly adapted to engage and disengage a male track member or other attachment element disposed at a panel structure. The clip assembly may provide an operative connection between the panel structure and an elongate strap or lanyard.

BACKGROUND OF THE INVENTION

There are many situations in which it may be desirable to secure a strap or other structure to a panel such as a sewn panel of a backpack or the like. One exemplary structure that has been used in the past is a so called "suspender clip" which uses a moveable jaw having projecting teeth that engage the edge portion of the panel. The moveable jaw may be held in place by a clasp member or by a spring. While such structures may be useful for many applications, the use of an engaging tooth structure may cause damage to the panel. This may be particularly true when the panel is formed from a fabric as is typically used in backpacks, luggage and other similar structures.

It is also known to use clip structures such as described in U.S. Pat. No. 5,388,313 to Cameron, and U.S. Pat. No. 7,308,739 to Andersen et al. the contents of all of which are hereby incorporated by reference. While such structures may provide good locking relation to the panel, they also may require relatively complex motions to lock and unlock the clip relative to the panel with a limited range of adjustability.

It is also known to pre-assemble a clamshell clamp structure about a piping track structure which is then sewn or otherwise adhered to the panel. However, this arrangement prevents removal of the clamp after the track structure is secured in place.

SUMMARY OF THE INVENTION

The present invention provides advantages and alternatives over the prior art by providing a clip assembly adapted to engage a male track member. The clip assembly includes a clamshell clamping member including a first leg and a second leg. The clip assembly further includes a female compression member adapted to fit in sliding relation at least partially about the clamshell clamping member. The female compression member is adapted to compress the first leg towards the second leg.

According to one exemplary aspect, the present invention provides a clip assembly including a clamshell clamping member having a first leg and a second leg. The first leg and the second leg are normally disposed in spaced relation to one another on opposing sides of a variable width gap. The first leg and the second leg define flexible spring elements moveable towards and away from one another and being normally biased to a predefined, spaced relation relative to one another. The first leg has a first distal end including a first interior surface and a first raised profile exterior surface. The second leg has a second distal end including a second interior surface and a second raised profile exterior surface. The first raised profile exterior surface and the second raised profile exterior surface project generally away from one another. The first interior surface and the second interior surface face generally towards one another. The first interior surface and the second interior surface are adapted to cooperatively surround at least a portion of the male track member. At least a first detent projects away from an outwardly facing surface of at least the first leg at a position rearward from the first distal end. A female compression member is adapted to fit in sliding relation at least partially about the clamshell clamping member. The female compression member is adapted to compress the first leg towards the second leg.

According to another exemplary aspect, the present invention provides a clip assembly including a clamshell clamping member having a first leg and a second leg. The first leg and the second leg are normally disposed in spaced relation to one another on opposing sides of a variable width gap. The first leg and the second leg define flexible spring elements moveable towards and away from one another and being normally biased to a predefined, spaced relation relative to one another. The first leg has a first distal end including a first interior surface and a first raised profile convex exterior surface. The second leg has a second distal end including a second interior surface and a second raised profile convex exterior surface. The first raised profile convex exterior surface and the second raised profile convex exterior surface project generally away from one another. The first interior surface and the second interior surface face generally towards one another. The first interior surface and the second interior surface are adapted to cooperatively surround at least a portion of the male track member. At least a first detent projects away from an outwardly facing surface of at least the first leg at a position rearward from the first distal end. A female compression member is adapted to fit in sliding relation at least partially about the clamshell clamping member. The female compression member includes a plurality of slot openings disposed along the female compression member. The slot openings are adapted to receive the first detent within the slot openings.

According to yet another exemplary aspect, the present invention provides a clip assembly including a clamshell clamping member including a first leg and a second leg. The first leg and the second leg are normally disposed in diverging spaced relation to one another on opposing sides of a variable width gap. The first leg and the second leg define flexible spring elements moveable towards and away from one another and are normally biased to a predefined, spaced relation relative to one another. The first leg has a first distal end including a first interior surface and a first raised profile convex exterior surface. The second leg has a second distal end including a second interior surface and a second raised profile convex exterior surface. The first raised profile convex exterior surface and the second raised profile convex exterior surface projecting generally away from one another. The first interior surface and the second interior surface face generally towards one another and are adapted to cooperatively surround at least a portion of the male track member. An eyelet opening is located at a position rearward of the first distal end and the second distal end. A first plurality of detents projects outwardly in spaced relation along a first outwardly facing surface of the clamping member at positions between the eyelet opening and the first distal end. A second plurality of detents project outwardly in spaced relation along a second outwardly facing surface of the clamshell clamping member at positions between the eyelet opening and the second distal end. A substantially hollow female compression member is adapted to fit in sliding relation at least partially about the clamping member. The female compression member includes a first plurality of slot openings disposed in stacked relation along a first side and a second plurality of slot openings disposed in stacked relation along a second side. The first plurality of slot openings is adapted to receive members of the first plurality of detents and the second plurality of slot openings is adapted to receive members of the second plurality of detents.

BRIEF DESCRIPTION OF THE DRAWINGS

FIG. 1 is an exploded perspective view of an exemplary clamshell clip assembly consistent with the present invention and engageable male track member;

FIG. 2 is a perspective view illustrating the clip assembly of FIG. 1 in assembled condition engaging the male track member;

FIG. 3 is a cut-away view illustrating the clip assembly of FIG. 1 in open condition with clamping arms spread relative to the male track member;

FIG. 4 is a view similar to FIG. 3 illustrating the clamping arms closed in loose relation about the male track member;

FIG. 5 is a view similar to FIG. 3 illustrating the clamping arms in locked relation about the male track member;

FIG. 6 is an exploded perspective view of another exemplary clamshell clip assembly consistent with the present invention and engageable male track member; and FIG. 7 is a perspective view illustrating the clip assembly of FIG. 6 in assembled condition engaging the male track member.

DETAILED DESCRIPTION OF THE PREFERRED EMBODIMENTS

Reference will now be made to the drawings, wherein to the extent possible, like elements are designated by like reference numerals throughout the various views.

Referring to FIG. 1, an exemplary clip assembly 10 is illustrated in disassembled condition in opposing relation to a male track member 12 such as piping or the like which may be affixed to a panel such as a fabric panel or the like (not shown). As illustrated, the exemplary track member 12 includes a bulbous edge 14 of enhanced diameter. The track member 12 also includes a generally planar attachment segment 16 extending away from the bulbous edge 14. As will be appreciated, the attachment segment 16 may be used as a platform for attachment of the track member 12 to a panel 18 such as a fabric panel or the like using sewn stitches, adhesive bonding, or other attachment mechanisms as will be known to those of skill in the art. In the attached relation of the track member 12 to the panel 18, the bulbous edge 14 defines a free edge which is spaced apart from the panel 18. By way of example only, and not limitation, the panel 18 may form a portion of an article of clothing, a back pack, luggage, or other structure as may be desired.

As illustrated, in the exemplary construction the clip assembly 10 includes a clamping member 20 and a compression sleeve 22. The compression sleeve 22 is substantially hollow and is adapted to slide over the clamping member 20 such that the compression sleeve 22 is disposed in at least partial surrounding relation to the clamping member 20.

As illustrated, the exemplary clamping member 20 has a split body construction defining a pair of opposing legs 24 disposed on opposite sides of a variable width gap. As shown, the opposing legs extend in slight diverging relation relative to one another. The opposing legs 24 are adapted to flex in spring-like manner towards and away from one another resulting in changes to the width of the gap.

In the illustrated exemplary construction, the legs 24 include generally "C" shaped distal end segments 26. As shown, the distal end segments 26 include convex exterior surfaces disposed in raised profile relative to proximal portions of the legs rearward of the distal end segments. In the illustrated exemplary construction, the distal end segments 26 further include concave interior surfaces adapted to nest about bulbous edge 14 as shown. In the illustrated construction, the convex exterior surfaces each define an arc of curvature extending along the length dimension of the corresponding leg towards a distal edge 27. The arcs of curvature defined by the exterior surfaces each have an apex spaced rearwardly from the distal edge 27 with a sloped surface between the apex and the distal edge 27.

In the illustrated, exemplary construction, the distal end segments 26 terminate at distal edges 27. The distal edges 27 of the exemplary construction are angled slightly such that the distal edges cooperatively form an angled opening that increases in width from the interior to the exterior. That is, the opening between the distal edges 27 is slightly wider at the exterior surface than at the interior surface. As will be appreciated, in this arrangement tangents to the distal edges will intersect at a position rearward of the distal edges. Such an outwardly diverging arrangement may aid in urging the distal end segments 26 outwardly as they are pressed against the bulbous edge 14 of the track member 12. Specifically, the distal edges 27 of angled construction may act as camming surfaces aiding in the spread of the legs 24 to a position as shown in FIG. 3.

In the illustrated construction, the concave interior surfaces of the distal end segments 26 cooperatively define a track acceptance channel 28 adapted to receive and hold the bulbous edge 14 of the track member 12 as illustrated in FIG. 2. As seen through joint reference to FIGS. 1 and 2, in the illustrated exemplary embodiment the clamping member 20 may also include an integral webbing eyelet opening 30 adapted to receive and hold an associated strap 32, in a form such as a webbing, lanyard, or other elongate element. As shown in FIG. 2, in the exemplary arrangement, the hollow compression sleeve 22 may be removed from surrounding relation to the clamping member 20 while nonetheless being held around the strap 32, if desired.

As best illustrated through joint reference to FIGS. 1 and 3, in the exemplary construction the compression sleeve 22 is held in place about the clamping member 20 by the cooperative engagement of an arrangement of slot openings 33, 34, 35 with detents 36, 38 projecting outwardly from the opposing surfaces of the clamping member 20. The cooperative engagement between the compression sleeve 22 and the clamping member 20 providing attachment to the track member 12 is illustrated through joint reference to FIGS. 3-5.

As shown, in the orientation illustrated in FIG. 3, the compression sleeve 22 has been advanced over the clamping member 20 to a position such that the first detents 36 engage a rearward pair of slot openings 33. In this position, the second detents 38 engage a forward pair of slot openings 35. In the arrangement illustrated in FIG. 3, the compression sleeve 22 is held in place by cooperative engagement of the slot openings with the first detents 36 and the second detents 38. However, the legs 24 remain free to flex substantially outwardly. Accordingly, the distal ends 26 of the legs 24 may be pushed around the bulbous edge 14 of the track member 12 in a press-fit relation as previously described.

Once the distal ends 26 of the clamping member 20 have been positioned relative to the track member 12, the compression sleeve 22 may be further advanced to the position as illustrated in FIG. 4 to block the clip assembly against withdrawal from the track member 12. As shown, in this position the second detents 38 engage an intermediate pair of slot openings 34 and the compression sleeve 22 presses against the exterior surfaces of the legs 24 at positions slightly rearward of the raised profile convex surfaces. In this condition, the compression sleeve prevents substantial outward flexing of the legs 24. However, the clip assembly 10 may nonetheless slide along the length of track member 12 due to the relatively loose engagement about the bulbous edge 14. Thus, the clip assembly 10 may be adjusted by sliding to different positions along the length of the track member 12 as may be desired.

Once the clip assembly 10 has been positioned at a desired position along the length of the track member 12, the desired position may thereafter be locked in place by further advancement of the compression sleeve 22 to an orientation as illustrated in FIG. 5. As shown, in this orientation the pair of second detents 38 engages the cooperating rear slot openings 33 and the collar portion 40 of the compression sleeve has been pushed at least partially over the raised profile convex surfaces of the "C" shaped distal end segments 26. In this condition, the legs 24 are pressed inwardly thereby substantially limiting outward flexing. The compression applied by the collar portion 40 thus clamps the distal end segments 26 securely in place around the track member 12. With this application of pressure, sliding movement along the track member 12 is substantially restricted.

In the event that a subsequent adjustment of the clip assembly 10 is desired, the relative position of the clamping member 20 and the compression sleeve 22 may be returned to the position illustrated in FIG. 4 if a sliding adjustment is desired or to the orientation illustrated in FIG. 3 if full removal is desired. Such adjustment may be carried out by the application of a relatively modest pressing force in the direction of desired movement. This adjustment may be facilitated by the slight diverging relation of the legs 24 relative to one another. Such a diverging relation provides a slight space between the opposing legs 24 thereby facilitating movement of the legs 24 towards one another as the detents move between the slot openings.

While the illustrated arrangement may be desirable for a number of uses, it is likewise contemplated that any number of other arrangements may likewise be utilized. By way of example only, and not limitation, one exemplary alternative arrangement is illustrated in FIGS. 6 and 7, wherein elements corresponding to those previously described are designated by like reference numerals within a 100 series. As illustrated, in this arrangement the slotted compression sleeve has been replaced with a sliding bar structure 122. The sliding bar structure 122 may pass around the clamping member 120 and engage a series of upstanding rib elements 136, 137, 138, 139. Of course, a greater or lesser number of rib elements may be used as desired. As the sliding bar structure is advanced over the rib elements, clamping pressure is applied to the legs 124 in the same manner as previously described. Accordingly, the clamping member 120 may engage and lock about the track member 12 as desired. The clip assembly may be subsequently adjusted by partial or complete withdrawal of the sliding bar 122.

Variations and modifications of the foregoing are within the scope of the present invention. It is understood that the invention disclosed and defined herein extends to all alternative combinations of two or more of the individual features mentioned or evident from the text and/or drawings. All of these different combinations constitute various alternative aspects of the present invention. The embodiments described herein explain the best modes known for practicing the invention and will enable others skilled in the art to utilize the invention. The claims are to be construed to include alternative embodiments to the extent permitted by the prior art.

Various features of the invention are set forth in the following claims

What is claimed is:

1. A clip assembly adapted to engage a male track member, the clip assembly comprising:
a clamshell clamping member including a first leg and a second leg, the first leg and the second leg being normally disposed in spaced relation to one another on opposing sides of a variable width gap, the first leg and the second leg defining flexible spring elements moveable towards and away from one another and being normally biased to a predefined, spaced relation relative to one another, the first leg having a first distal end including a first interior surface and a first raised profile exterior surface, the second leg having a second distal end including a second interior surface and a second raised profile exterior surface, the first raised profile exterior surface and the second raised profile exterior surface projecting generally away from one another, the first interior surface and the second interior surface facing generally towards one another, the first interior surface and the second interior surface adapted to cooperatively surround at least a portion of the male track member, at least a first detent projecting away from an outwardly facing surface of at least the first leg at a position rearward from the first distal end, the detent having forward and rearward camming ramp surfaces, wherein each of the first interior surface and the second interior surface is a concave surface defining an arc of curvature extending along the length dimension of the corresponding leg and wherein each of the first raised profile exterior surface and the second raised profile exterior surface is a convex curved surface defining an arc of curvature extending along the length dimension of the corresponding leg towards a distal edge, the arcs of curvature defined by the exterior surfaces each having an apex spaced rearwardly from the distal edge with a sloped surface between the apex and the distal edge; and
a female compression member adapted to fit in reversible, reciprocating sliding relation at least partially about the clamshell clamping member, the female compression member being adapted to compress the first leg towards the second leg, the female compression member being adapted to pass over the detent during forward and rearward movement of the female compression member, the female compression member being adapted to extend at least partially up and over the first raised profile exterior surface and the second raised profile exterior surface while engaging the detent when the female compression member is in a forward position, wherein at least a second detent projects away from an outwardly facing surface of at least the second leg at a position rearward from the second distal end, wherein a first plurality of slot openings is disposed along a first side of the female compression member, the first plurality of slot openings defining a series of openings in a wall of the female compression member adapted to reversibly receive and release the first detent during forward and rearward sliding of the female compression member, and wherein the female compression member includes a second plurality of slot openings disposed along a second side of the female compression member in opposing relation to the first side of the female compression member, the second plurality of slot openings defining a series of openings in a wall of the female compression member adapted to reversibly receive and release the second detent during forward and rearward sliding of the female compression member.

2. The clip assembly as recited in claim 1, wherein the clamshell clamping member includes an eyelet opening disposed at a position rearward of the first distal end and the second distal end.

3. The clip assembly as recited in claim 2, further including an elongate strap member operatively connected to the eyelet opening and extending away from the clamshell clamping member.

4. The clip assembly as recited in claim 3, wherein the female compression member is moveable in sliding relation between a first position about the elongate strap member and a second position about the clamshell clamping member.

5. The clip assembly as recited in claim 1, wherein at least the first distal end has a substantially "C" shaped cross-sectional profile cooperatively defined by the first interior surface and the first raised profile exterior surface.

6. The clip assembly as recited in claim 5, wherein the second distal end has a substantially "C" shaped cross-sectional profile cooperatively defined by the second interior surface and the second raised profile exterior surface.

7. The clip assembly as recited in claim 6, wherein the first distal end terminates at a first distal edge and the second distal end terminates at a second distal edge, the first distal edge and the second distal edge being disposed on opposing sides of a slot opening, at least one of the first distal edge and the second distal edge being angled such that tangents to the first distal edge and the second distal edge intersect at a position rearward of the distal edges.

8. The clip assembly as recited in claim 1, wherein the female compression member includes a leading edge adapted to engage and compress the first raised profile convex exterior surface and the second raised profile convex exterior surface.

9. A clip assembly adapted to engage a male track member, the clip assembly comprising:

a clamshell clamping member including a first leg and a second leg, the first leg and the second leg being normally disposed in spaced relation to one another on opposing sides of a variable width gap, the first leg and the second leg defining flexible spring elements moveable towards and away from one another and being normally biased to a predefined, spaced relation relative to one another, the first leg having a first distal end including a first interior surface and a first raised profile convex exterior surface, the second leg having a second distal end including a second interior surface and a second raised profile convex exterior surface, the first raised profile convex exterior surface and the second raised profile convex exterior surface projecting generally away from one another, the first interior surface and the second interior surface facing generally towards one another, the first interior surface and the second interior surface adapted to cooperatively surround at least a portion of the male track member, wherein at least the first interior surface is a concave surface defining an arc of curvature extending along the length dimension of the first leg and wherein at least the first raised profile exterior surface is a convex curved surface defining an arc of curvature extending along the length dimension of the first leg towards a distal edge, the arc of curvature defined by the exterior surface having an apex spaced rearwardly from the distal edge with a sloped surface between the apex and the distal edge, at least a first plurality of detents projecting away from an outwardly facing surface of at least the first leg at different distances rearward from the first distal end, each of the detents having forward and rearward camming ramp surfaces; and a female compression member adapted to fit in reversible, reciprocating sliding relation at least partially about the clamshell clamping member and to compress the first leg towards the second leg, the female compression member including a first plurality of slot openings disposed along a first side of the female compression member, the first plurality of slot openings defining a series of openings in a wall of the female compression member adapted to reversibly receive and release the first plurality of detents during forward and rearward sliding of the female compression member, wherein at least a second plurality of detents projects away from an outwardly facing surface of at least the second leg at different distances rearward from the second distal end and wherein the female compression member includes a second plurality of slot openings disposed along a second side of the female compression member in opposing relation to the first side of the female compression member, the second plurality of slot openings defining a series of openings in a wall of the female compression member adapted to reversibly receive and release the second plurality of detents during forward and rearward sliding of the female compression member.

10. The clip assembly as recited in claim 9, wherein the clamshell clamping member includes an eyelet opening disposed at a position rearward of the first distal end and the second distal end.

11. The clip assembly as recited in claim 10, further including an elongate strap member operatively connected to the eyelet opening and extending away from the clamshell clamping member.

12. The clip assembly as recited in claim 9, wherein at least the first distal end has a substantially "C" shaped cross-sectional profile cooperatively defined by the first interior surface and the first raised profile exterior surface.

13. The clip assembly as recited in claim 12, wherein the second distal end has a substantially "C" shaped cross-sectional profile cooperatively defined by the second interior surface and the second raised profile exterior surface.

14. A clip assembly adapted to engage a male track member, the clip assembly comprising:

a clamshell clamping member including a first leg and a second leg, the first leg and the second leg being normally disposed in diverging spaced relation to one another on opposing sides of a variable width gap, the first leg and the second leg defining flexible spring elements moveable towards and away from one another and being normally biased to a predefined, spaced relation relative to one another, the first leg having a first distal end including a first interior surface and a first raised profile convex exterior surface, the second leg having a second distal end including a second interior surface and a second raised profile convex exterior surface, the first raised profile convex exterior surface and the second raised profile convex exterior surface projecting generally away from one another, the first interior surface and the second interior surface facing generally towards one another, the first interior surface and the second interior surface adapted to cooperatively surround at least a portion of the male track member, wherein each of the first interior surface and the second interior surface is a concave surface defining an arc of curvature extending along the length dimension of the corresponding leg and wherein each of the first raised profile exterior surface and the second raised profile exterior surface is a convex curved surface defining an arc of curvature extending along the length dimension of the corresponding leg towards a distal edge, the arcs of curvature defined by the exterior surfaces each having an apex spaced rearwardly from the distal edge with a sloped surface between the apex and the distal edge, an eyelet opening disposed at a position rearward of the first distal end and the second distal end, a first plurality of detents projecting outwardly in spaced relation along a first outwardly facing surface of the clamshell clamping member at positions between the eyelet opening and the first distal end, a second plurality of detents projecting outwardly in spaced relation along a second outwardly facing surface of the clamshell clamping member at positions between the eyelet opening and the second distal end each of the detents having forward and rearward camming ramp surfaces; and a substantially hollow female compression member adapted to fit in reversible, reciprocating sliding relation at least partially about the clamshell clamping member, the female compression member including a first plurality of slot openings disposed in stacked relation along a first side of the female compression member and a second plurality of slot openings disposed in stacked relation along a second side of the female compression member, the first plurality of slot openings being adapted to receive and release members of the first plurality of detents during forward and rearward sliding of the female compression member and the second plurality of slot openings being adapted to receive and release members of the second plurality of detents during forward and rearward sliding of the female compression member.

* * * * *